United States Patent [19]
Harris et al.

[11] 3,882,258
[45] May 6, 1975

[54] DRY PREPARED FLUFFY FROSTING MIXES

[75] Inventors: Ronald David Harris, Wyoming; Richard Morris Roudebush, Cincinnati, both of Ohio

[73] Assignee: The Procter & Gamble Company, Cincinnati, Ohio

[22] Filed: Feb. 5, 1973

[21] Appl. No.: 329,477

[52] U.S. Cl. .............................. 426/572; 426/473
[51] Int. Cl. .............................................. A23g 3/00
[58] Field of Search ..... SN/128, 159; 426/163, 473, 426/162, 362

[56] References Cited
UNITED STATES PATENTS

| | | |
|---|---|---|
| 3,199,988 | 8/1965 | Kozlik et al. ........................ 99/139 |
| 3,230,090 | 1/1966 | Weiss................................ 99/139 X |
| 3,514,297 | 5/1970 | Campbell et al. ................ 99/118 P |
| 3,628,968 | 4/1968 | Noznick ............................. 99/139 |

*Primary Examiner*—A. Louis Monacell
*Assistant Examiner*—J. M. Hunter

[57] ABSTRACT

Dry prepared fluffy frosting mixes containing polyglycerol esters as the foaming/aerating agent are prepared by melting and flaking polyglycerol esters, pulverizing the polyglycerol esters in a pin mill, mixing the pulverized polyglycerol esters with other dry ingredients, such as sugar, flavors, and thickeners, and finally pulverizing the resultant mixture.

9 Claims, No Drawings

3,882,258

DRY PREPARED FLUFFY FROSTING MIXES

CROSS REFERENCE

This application is a continuation-in-part of commonly assigned, co-pending application, Ser. No. 128,159, filed March 25, 1971 and now abandoned.

BACKGROUND OF THE INVENTION

The field of this invention is food products. More specifically, the invention relates to edible toppings known as fluffy frostings. Fluffy frostings are uncooked, generally shortening-free, aqueous, compositions which are used as toppings on cakes, cupcakes, and other desserts. Fluffy frostings are normally light and highly aerated. They have a unique and desirable mouth feel and eating quality provided by the high level of aeration (combined usually with the absence of shortening) and therefore these products are favored by consumers as a topping or filling for baked items, ice cream, candy and the like.

Fluffy frostings conventionally consist predominantly of sugar and water and also must contain a foaming/aerating agent. As prepared in the home, fluffy frostings almost always utilize egg white as the foaming/aerating agent. Dry mixes which can be whipped into a fluffy frosting upon the addition of water are commercially available. These products generally utilize egg albumen or a similar protein source as the foaming/aerating agent and they also contain a stabilizer for the foam which is usually a gum-type material such as algin, gelatin, or a cellulose derivative such as carboxymethyl cellulose.

A primary disadvantage possessed by conventional fluffy frostings is their instability over a period of time. A further disadvantage possessed by commercially available fluffy frosting mixes is the fact that the protein foaming/aerating agent is generally a very expensive ingredient and is susceptible to microbiological attack. To solve the above problems, it was discovered that certain polyglycerol esters of fatty acids could be utilized as the foaming/aerating agent in fluffy frostings. U.S. Pat. No. 3,592,663 discloses frosting containing polyglycerol esters which can be highly aerated and are so exceptionally stable that they do not require a stabilizer.

A dry mix based on the polyglycerol ester per se is not desirable since the specific polyglycerol esters suitable for use herein exists in the form of hard, brittle waxy solids. Dry granular ingredients can be blended with the polyglycerol ester to form a dry prepared mix, but known methods have not been able to attain sufficient dispersion of the polyglycerol ester to provide a functional dry frosting mix. Previously, in order to obtain a dry frosting mix in which the polyglycerol esters were dispersed well enough to be functional, the polyglycerol esters had to be pre-dispersed in glycerine, as described in the above-mentioned copending application, or in an aqueous solution of sucrose and dextrose as described in U.S. Pat. No. 3,726,691.

Accordingly, it is an object of this invention to provide a process by which a highly functional polyglycerol ester dry prepared fluffy frosting mix can be prepared. It is a further object of this invention to provide a process by which excellent dispersion of polyglycerol esters can be achieved in a dry fluffy frosting mix without the necessity of predispersal techniques.

SUMMARY OF THE INVENTION

Dry prepared polyglycerol ester fluffy frosting mixes are prepared by melting and flaking polyglycerol esters, pulverizing the polyglycerol esters in a pin mill so that the particle size is very small while maintaining the polyglycerol esters at a temperature below their melting point, mixing the pulverized polyglycerol esters with sugar, flavors, and thickeners, and then pulverizing the resultant mixture into very small particles. It is preferred that the polyglycerol esters be combined with a dry edible material, such as sucrose or dextrose, before they are pulverized. It is also preferred that dry ice be combined with the polyglycerol esters to maintain the temperature below their melting point. This process provides a highly functional polyglycerol ester dry fluffy frosting mix by grinding the polyglycerol esters into minute particles so they can be easily dispersed throughout the dry frosting mix. The frosting can be easily made from this mix by mixing hot water with the dry mix and whipping the resulting mixture.

DETAILED DESCRIPTION OF THE INVENTION

The characterizing ingredient in the fluffy frosting compositions of the present invention comprises certain polyglycerol esters of fatty acids. These materials are polyglycerol esters containing from about 2 to about 12 glycerol units and from about 1 to about 4 fatty acid groups per molecule. Polyglycerol essentially is a polymer which is formed by the dehydration of glycerine and is well-known in the art. See, for example, the above-described U.S. Pat. No. 3,592,663.

Polyglycerols can be esterified by reaction with fatty acids. Esterification can take place at any or all of the hydroxyl groups but generally occurs predominantly at the secondary hydroxyl positions, leaving the terminal hydroxyl group unaffected. Depending upon the reaction conditions and the ratio of fatty acid to polyglycerol, the number of secondary hydroxyl groups which are esterified varies. By controlling the balance of esterified to unesterified hydroxyl groups, the lipophilic-hydrophilic balance of the polyglycerol ester can be varied. With an increasing number of esterified hydroxyl groups, the polyglycerol esters become progressively more lipophilic and progressively less hydrophilic. This lipophilic-hydrophilic balance in the polyglycerol ester is important in preparing polyglycerol esters for use as a fluffy frosting ingredient. Generally, sufficient lipophilic properties are imparted to the polyglycerol ester by the fatty acid esterification of a single hydroxyl group. However, to maintain sufficient hydrophilic properties in the molecule, the polyglycerol ester cannot contain more than about 4 fatty acid radicals. Preferably, the polyglycerol ester will contain about 3 fatty acid radicals. In this same regard, the polyglycerol ester used in the dry prepared fluffy mixes of this invention can contain from about 2 to about 12 glycerol units, and preferably contains about 3 to about 4 glycerol units.

The fatty acid groups can be derived from suitable naturally-occuring or synthetic fatty acids and can be saturated or unsaturated, but are preferably substantially saturated. Examples of these fatty acids are caprylic, capric, lauric, myristic, palmitic, stearic, oleic, linoleic, arachidic, behenic, erucic, lignoceric, and shibic. The latter four named fatty acids contain at least about 22 carbon atoms.

Polyglycerol which has been esterified with a mixture of fatty acids can be used in the dry prepared fluffy frosting mixes herein. A possible mixture of fatty acids comprises (on a weight percent basis) behenic 40–80 percent, arachidic 0–45 percent, stearic 4–60 percent, palmitic 2–20 percent, myristic 0–20 percent, lauric 0–18 percent, and capric 0–10 percent. The polyglycerol ester of mixed fatty acids can comprise mixed fatty acid radicals on each individual polyglycerol molecule (so that all the polyglycerol molecules are substantially the same) or can comprise the same fatty acid radical on each individual polyglycerol ester molecule (so that all the individual polyglycerol molecules are not the same). A preferred mixture of fatty acids, and the preferred polyglycerol ester for use herein, is a mixture stearic and palmitic acids as described in U.S. Pat. No. 3,803,333.

In actual practice polyglycerol esters usually contain a mixture of molecules that average the specified number of glycerol units and fatty acid ester groups per glycerol unit; individual molecules within the mixture can vary from the average. For example, decaglycerol tristearate contains an average of about 10 glycerol units per molecule and an average of about 3 fatty acid ester (stearoyl) groups per molecule while some individual molecules could contain 8, 9, 11, or 12 glycerol units and 2 or 4 fatty acid ester groups. Such mixtures are within the scope of this invention.

The polyglycerol esters can be prepared by conventional direct or interesterification techniques. Suitable methods of forming the specified polyglycerol esters are disclosed by Harris, U.S. Pat. Nos. 2,022,766 and 2,023,388, both granted Dec. 3, 1935, and in British Pat. No. 1,025,265, Apr. 6, 1966. See also Bakers Digest, 37 No. 5, pp. 72–75 (October, 1963).

This invention provides a process for making highly functional dry fluffy frosting mixes. Polyglycerol esters are hard brittle waxy solids and are therefore difficult to disperse in a dry mix. Such dry mixes do not exhibit a desirable degree of functionality unless the polyglycerol esters are very finely dispersed throughout the dry mixes.

It has been discovered that dry prepared fluffy frosting mixes can be produced by grinding the hard brittle waxy polyglycerol ester into minute particles which are easily dispersed. According to the process of the present invention, the polyglycerol esters can be melted and flaked to facilitate the pulverizing step. The melted polyglycerol esters are flaked on a conventional fat flaking roll. A film of melted polyglycerol esters forms on the roll, solidifies because the roll absorbs heat, and is scraped off of the roll, thus forming flakes. The next step is to pulverize the polyglycerol esters, such as in a pin mill, to such an extent that the particles are very small, preferably so that 95 percent of the particles will pass through an 80 mesh screen, and 5 percent of the particles will pass through a 100 mesh screen. The polyglycerol esters must be in solid form to be pulverized. Therefore, during the pulverizing process, the temperature of the polyglycerol esters must be maintained below their melting point (about 120°F–130°F). The preferred method of maintaining the temperature of the polyglycerol esters below their melting point during grinding is to combine them with dry ice before grinding. It is highly preferred that the polyglycerol esters be pulverized to such an extent that 98 to 100 percent of the particles will pass through a 100 mesh screen, and 75 to 90 percent of the particles will pass through a 200 mesh screen. This particle size will provide excellent dispersion of the polyglycerol esters. It is preferable to combine the polyglycerol esters with sucrose, dextrose, or other dry edible material before grinding. The dry edible material helps to prevent agglomeration of the polyglycerol esters after grinding. The pulverized polyglycerol esters or combination are then added to a dry mixture comprising sugar, flavoring, and thickeners. The pulverized polyglycerol esters or combination and the dry mixture are blended together such as in a ribbon or Hobart-type mixer. It is preferred that the resulting blend be pulverized again, preferably so that 95 percent of the particles will pass through a 80 mesh screen, and 5 percent of the particles will pass through a 100 mesh screen. It is highly preferred that the resulting blend be pulverized to such an extent that 98 to 100 percent of the particles will pass through a 100 mesh screen, and 75 to 90 percent of the particles will pass through a 200 mesh screen. This particle size will provide excellent dispersion of the polyglycerol esters. It has been discovered that the above combination of process steps allows the preparation of a highly functional dry mix by providing for a uniform dispersion of the hard brittle ester therein.

Coarser grinds than those specified will greatly extend the whip time of the finished frosting mix. Coarser grinds will also decrease the aeration and thereby decrease the stability of the frosting on the cake. If the grind is too coarse, the dispersion will be poor and the functionality will be undesirable. Finer grinds can be used but are not necessary to attain the desired functionality in the frosting mix.

The sweetening agent included in the dry prepared fluffy frosting mixes of this invention can be any suitable sugar, such as sucrose, dextrose, lactose, glucose, or galactose, or an artificial sweetener such as saccharin. Sucrose and/or dextrose are preferred sweetening agents. A minor amount of salt can be added and any conventional flavor material can also be added to the dry prepared fluffy frosting mixes.

Conventional foaming/aerating agents for fluffy frostings, such as whole milk or egg white, can be added to the dry prepared mixes of this invention but they are not required and are preferably omitted. Conventional thickening agents for fluffy frostings, such as carrageenan, agar, guar, carboxymethyl cellulose, starch, or gelatin, can also be added to the dry prepared mixes of this invention to affect eating characteristics such as mouth feel, but are not required for stabilization. In the particular polyglycerol ester-based dry prepared fluffy frosting mixes of the present invention, it is preferable to omit shortening from the formulation. Shortening or other fat, particularly in liquid form, can decrease the foaming/aerating properties of the polyglycerol ester-based dry prepared fluffy frosting mixes of the present invention.

When fluffy frostings are prepared from the dry mixes of this invention, they require only the addition of hot water and beating in a bowl to yield within a few minutes a highly aerated, aqueous fluffy frosting with a smooth viscous texture. For example, mixing in a conventional household electric mixer for a period of less than ten minutes is sufficient to whip the composition into an aerated fluffy frosting. The compositions tend to reach minimum density faster, e.g., they reach minimum density in less than about 3 minutes, than do conventional fluffy frostings when mixed in a household electric mixer. Additional mixing, e.g., for 1 to 5 minutes beyond this point is desirable to assure uniformity.

The aerated, aqueous, fluffy frostings prepared from the dry mixes of this invention have a smooth viscous texture at least comparable to commercial products and an aerated structure superior thereto in terms of density and stability. Frostings of increased stability and acceptable from every standpoint, particularly in respect to their chiffon-like or fluffy mouth-feel, are provided by the invention.

The dry prepared fluffy frosting mixes disclosed herein are economical to use and have a particular advantage in this respect in that substantially more volume of frosting can be obtained from a given weight of ingredients than with conventional fluffy frostings because of the high aeration properties and corresponding low density of the frostings of this invention.

The frostings of the invention are more aerated than conventional fluffy frostings as indicated by their density which is generally less than about 0.3 gm/cc. Because of the high level of air which they contain, the frostings have a very desirable glossy-type appearance. The icings do not have a tendency to leak, i.e., lose liquid upon storage. Further, the frostings do not change in appearance or eating quality upon storage.

The following example is meant only to illustrate the invention and not to limit it in any way.

EXAMPLE

A 500 gram sample of polyglycerol esters (a mixture of stearate polyglycerol ester and palmitate polyglycerol ester in a ratio of 4:1) which previously has been melted and flaked is weighed out with 500 grams of dextrose. Approximately 1000 grams of crushed dry ice is added to this mixture and blended in a Hobart mixer for approximately 2 minutes to insure homogeneity and adequate cooling. This mixture is then put through an Alpine pin mill at a rate of approximately 60 pounds per hour. One pass is used and the particle size is such that 98 to 100 percent of the particles will pass through a 100 mesh screen and 75 to 90 percent of the particles will pass through a 200 mesh screen. The temperature of the mill and the mixture should be kept below the melting point of the polyglycerol esters.

This pulverized mixture of polyglycerol esters and dextrose is then incorporated into a fluffy frosting mix according to the following formula:

| Ingredients | |
|---|---|
| Sucrose | 60.465% |
| Dextrose | 29.095% |
| Salt | 0.48% |
| Gelatin | 1.0% |
| Artificial vanilla | 0.94% |
| Artificial almond flavor | 0.02% |
| Pulverized mixture of polyglycerol esters and dextrose (50–50) | 8.0% |
| | 100.000% |

All of the ingredients are mixed together in a paddle or ribbon mixer for approximately 10 minutes and then put through the Alpine pin mill again. This mixture was not pre-cooled; however, the temperature did not exceed the melting point of the polyglycerol esters.

To prepare the fluffy white frosting, take 128 grams of the pulverized dry mix and blend with 120 grams of hot or boiling water (180°F to 210°F) for 30 seconds in a kitchen-type mixer. Then whip the blend at high speed for 3 to 5 minutes or until the blend forms stiff peaks.

The fluffy frostings made by this process are of excellent quality, have a high gloss, excellent stability on the cake (i.e., they do not deaerate or soak into the cake), and retain their fresh eating quality characteristics upon extended storage.

What we claim is;

1. A process for making a dry prepared fluffy frosting mix which comprises the steps of:
   a. melting and flaking a polyglycerol ester containing from about 2 to about 12 glycerol units and from about 1 to about 4 fatty acid groups per molecule;
   b. pulverizing said polyglycerol ester to a small particle size while maintaining the polyglycol ester at a temperature below its melting point;
   c. blending said pulverized polyglycerol ester with a dry mixture comprising sugar, and flavoring; and
   d. pulverizing the resulting blend to such an extent that 95 percent of the particles will pass through an 80 mesh screen and 5 percent of the particles will pass through a 100 mesh screen.

2. The process of claim 1 wherein the particles are pulverized to such an extent that 98 to 100 percent of the particles will pass through a 100 mesh screen and 75 to 90 percent of the particles will pass through a 200 mesh screen.

3. The process of claim 1 wherein the pulverizing is accomplished by using a pin milling apparatus.

4. The process of claim 3 wherein the melted and flaked polyglycerol ester is combined with dry ice before it is pulverized thereby to maintain the temperature of the polyglycerol ester below its melting point.

5. The process of claim 3 wherein the melted and flaked polyglycerol ester is combined with a dry edible material before it is pulverized.

6. The process of claim 5 wherein the dry edible material is combined with dry ice thereby to maintain the temperature of the polyglycerol ester below its melting point.

7. The process of claim 6 wherein the dry edible material is selected from the group consisting of sucrose and dextrose.

8. The process of claim 6 wherein the polyglycerol ester consists of a mixture of stearic acid polyglycerol ester and palmitic acid polyglycerol ester.

9. The process of claim 6 wherein the dry sugar of step (b) consists of a mixture of sucrose and dextrose.

* * * * *